(12) United States Patent
Chen

(10) Patent No.: US 7,950,564 B2
(45) Date of Patent: May 31, 2011

(54) SOLDERING IRON DEVICE, SOLDERING IRON CONTROL MODULE AND SOLDERING CONTROL METHOD THEREOF

(75) Inventor: Shih-Jie Chen, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 12/429,591

(22) Filed: Apr. 24, 2009

(65) Prior Publication Data

US 2010/0084455 A1    Apr. 8, 2010

(30) Foreign Application Priority Data

Oct. 6, 2008    (TW) ................................ 97138420 A

(51) Int. Cl.
*B23K 3/03* (2006.01)
*B23K 3/02* (2006.01)

(52) U.S. Cl. ................. 228/8; 228/51; 228/102

(58) Field of Classification Search ............... 228/102, 228/103, 8, 9, 12, 51, 54
See application file for complete search history.

(56) References Cited

U.S. PATENT DOCUMENTS

| | | | | |
|---|---|---|---|---|
| 2,355,883 A | * | 8/1944 | Mathews | 165/68 |
| 2,494,840 A | * | 1/1950 | Stephenson | 219/231 |
| 2,570,041 A | * | 10/1951 | Wedmore | 219/230 |
| 3,056,015 A | * | 9/1962 | Lovelace | 219/85.1 |
| 3,646,577 A | * | 2/1972 | Ernst | 219/241 |
| 4,762,979 A | * | 8/1988 | Geoffroi | 219/242 |
| 4,999,480 A | * | 3/1991 | Smith | 219/242 |
| 5,280,851 A | * | 1/1994 | Neukum | 228/20.5 |
| 5,472,133 A | * | 12/1995 | Lin | 228/8 |

* cited by examiner

*Primary Examiner* — Roy King
*Assistant Examiner* — Michael Aboagye
(74) *Attorney, Agent, or Firm* — Lowe Hauptman Ham & Berner, LLP

(57) ABSTRACT

A soldering iron control module applied to a soldering iron and a soldering iron stand is provided. The soldering iron stand accommodates the soldering iron which has a soldering iron bit. The soldering iron control module includes a sensing unit and a soldering iron control system. The sensing unit provides a sensing signal indicating whether the soldering iron is accommodated in the soldering iron stand. The soldering iron control system includes a tin supply unit and a control unit. The control unit determines whether the soldering iron has been accommodated in the soldering iron stand for a first time period according to the sensing signal. When the control unit determines that the soldering iron has been accommodated in the soldering iron stand for the first time period, the tin supply unit provides the tin to the soldering iron bit and the power of the soldering iron is turned off.

10 Claims, 2 Drawing Sheets

SOLDERING IRON DEVICE, SOLDERING IRON CONTROL MODULE AND SOLDERING CONTROL METHOD THEREOF

This application claims the benefit of Taiwan application Serial No. 97138420, filed Oct. 6, 2008, the subject matter of which is incorporated herein by reference.

BACKGROUND OF THE INVENTION

1. Field of the Invention

The invention relates in general to an electrical device and a control module and a control method thereof and more particularly to a soldering iron device and a soldering iron control module and a soldering iron control method thereof.

2. Description of the Related Art

In order to protect the soldering iron bit of the soldering iron, the soldering iron bit is usually tinned before the power of the soldering iron is turned off, lest the soldering iron bit may contact with the air and become oxidized. However, after the usage the soldering iron, the user often forgets to tin the soldering iron bit. As a result, the soldering iron bit is gradually oxidized and the lifespan of the soldering iron is shortened.

SUMMARY OF THE INVENTION

The invention is directed to a soldering iron device and a soldering iron control module and a soldering iron control method thereof capable of automatically tinning the soldering iron bit of the soldering iron which has not been used for a time period to avoid the soldering iron bit being oxidized so as to increase the lifespan of the soldering iron.

According to a first aspect of the present invention, a soldering iron control module applied to a soldering iron and a soldering iron stand is provided. The soldering iron stand is for accommodating the soldering iron which has a soldering iron bit. The soldering iron control module includes a sensing unit and a soldering iron control system. The sensing unit is for providing a sensing signal indicating whether the soldering iron is accommodated in the soldering iron stand. The soldering iron control system includes a tin supply unit and a control unit. The control unit determines whether the soldering iron has been accommodated in the soldering iron stand for a first time period according to the sensing signal. When the control unit determines that the soldering iron has been accommodated in the soldering iron stand for the first time period, the control unit controls the tin supply unit to provide the tin to the soldering iron bit so as to protect the soldering iron bit, and turns off the power of the soldering iron.

According to a second aspect of the present invention, a soldering iron device including a soldering iron, a soldering iron stand and a soldering iron control module is provided. The soldering iron has a soldering iron bit. The soldering iron stand is for accommodating the soldering iron. The soldering iron control module includes a sensing unit and a soldering iron control system. The sensing unit is for providing a sensing signal indicating whether the soldering iron is accommodated in the soldering iron stand. The soldering iron control system includes a tin supply unit and a control unit. The control unit determines whether the soldering iron has been accommodated in the soldering iron stand for a first time period according to the sensing signal. When the control unit determines that the soldering iron has been accommodated in the soldering iron stand for the first time period, the control unit controls the tin supply unit to provide the tin to the soldering iron bit so as to protect the soldering iron bit, and turns off the power of the soldering iron.

According to a third aspect of the present invention, a soldering iron control method is provided. The method includes the following steps. Firstly, a sensing signal indicating whether a soldering iron is accommodated in a soldering iron stand is provided. Next, whether the soldering iron has been accommodated in the soldering iron stand for a first time period is determined according to the sensing signal. Then, the tin is provided to the soldering iron bit of the soldering iron so as to protect the soldering iron bit, and the power of the soldering iron is turned off.

The invention will become apparent from the following detailed description of the preferred but non-limiting embodiments. The following description is made with reference to the accompanying drawings.

DETAILED DESCRIPTION OF THE INVENTION

Figure 1A:
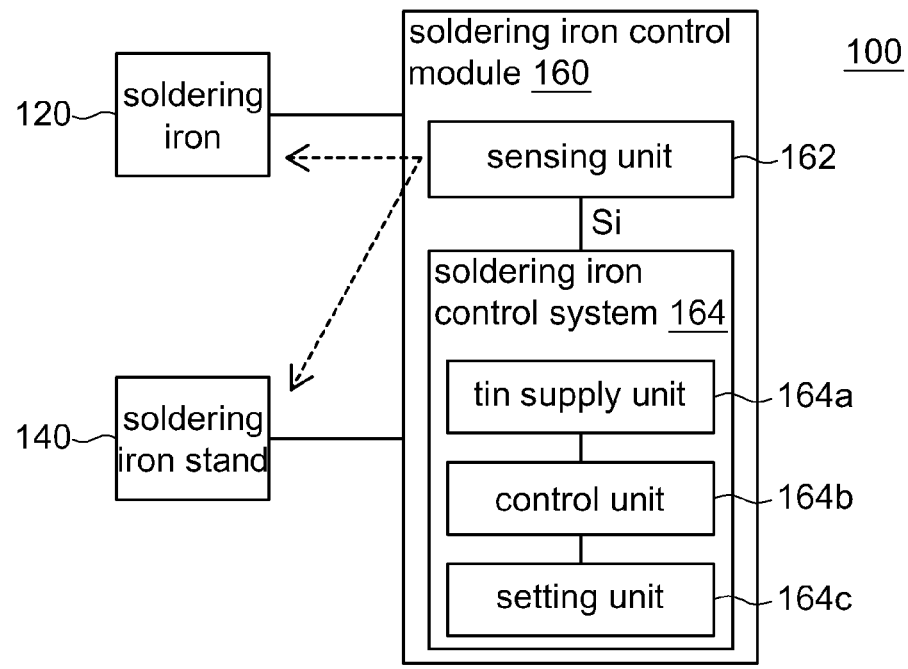
FIG. 1A shows a block diagram of a soldering iron device and a soldering iron control module thereof according to an embodiment of the invention.

Referring to FIG. 1A, a block diagram of a soldering iron device and a soldering iron control module thereof according to an embodiment of the invention is shown. The soldering iron device 100 includes a soldering iron 120, a soldering iron stand 140 and a soldering iron control module 160. The soldering iron 120 has a soldering iron bit. The soldering iron stand 140 is for accommodating the soldering iron 120. The soldering iron control module is applied to the soldering iron 120 and the soldering iron stand 140.

The soldering iron control module 160 includes a sensing unit 162 and a soldering iron control system 164. The sensing unit 162 is for providing a sensing signal Si indicating whether the soldering iron 120 is accommodated in the soldering iron stand 140. The soldering iron control system 164 includes a tin supply unit 164a and a control unit 164b. The control unit 164b determines whether the soldering iron 120 has been accommodated in the soldering iron stand 140 for a first time period according to the sensing signal Si. When the control unit 164b determines that the soldering iron 120 has been accommodated in the soldering iron stand 140 for the first time period, the control unit 164b controls the tin supply unit 164a to provide the tin to the soldering iron bit 122 of the soldering iron 120 so as to protect the soldering iron bit 122, and turns off the power of the soldering iron 120.

Figure 1B:
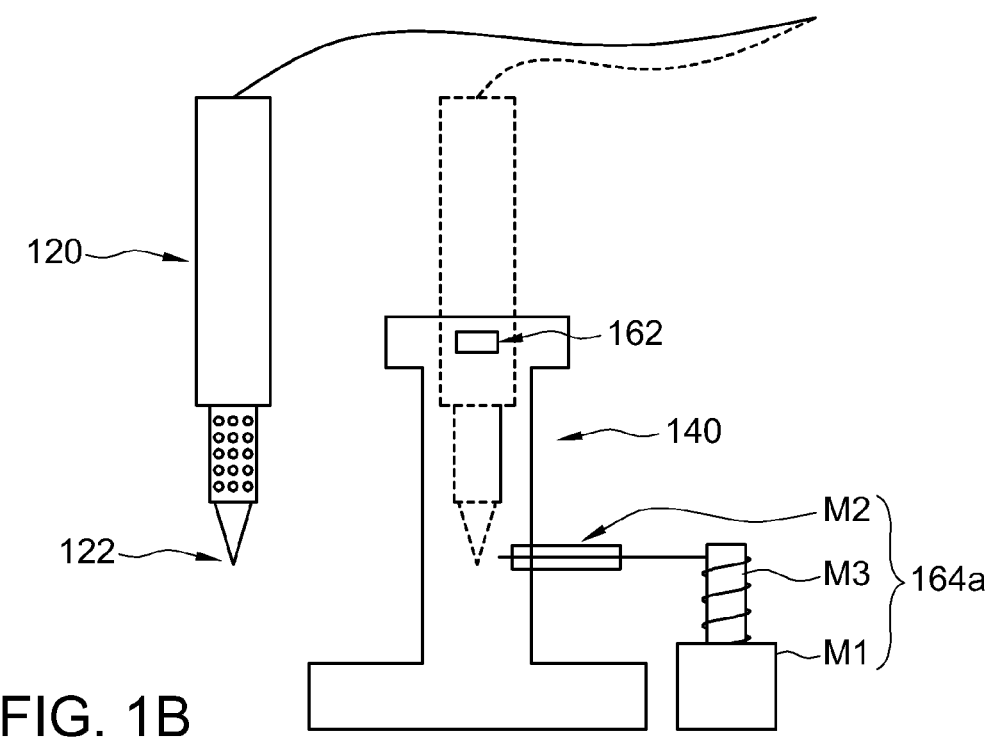
FIG. 1B shows an example of a portion of the elements of the soldering iron device of FIG. 1A.

In an embodiment, the sensing unit 162 is coupled to the soldering iron 120 and the soldering iron stand 140. Referring to FIG. 1B, an example of a portion of the elements of the soldering iron device 100 of FIG. 1A is shown. The sensing unit 162 can be implemented by a light sensor which determines the output of the sensing signal Si by detecting whether the soldering iron 120 is accommodated in the soldering iron stand. For example, the light sensor is disposed on the soldering iron stand 140 and the sensing signal Si is provided by way of light sensing. The sensing signal Si is a voltage signal indicating whether the soldering iron 120 is accommodated in the soldering iron stand 140. More specifically, when the soldering iron 120 is not accommodated in the soldering iron stand 140, a voltage signal provided by the light sensor excited by an environmental light has a first level, such as a high voltage level. When the soldering iron 120 is accommodated in the soldering iron stand 140, the environmental light supposed to excite the light sensor will be blocked by the soldering iron 120 accommodated in the soldering iron stand 140, so that the level of the sensing signal provided by the light sensor is changed. For example, the level of the sensing signal is changed to a second level, which is a low voltage level. Thus, due to the sensing signal Si provided by the sensing unit 162, the control unit 164b will be able to determine whether the soldering iron 120 is accommodated in the soldering iron stand 140.

When the control unit 164b determines that the soldering iron 120 is accommodated in the soldering iron stand 140, the soldering iron 120 may be not in use at this moment. Thus, if the control unit 164b determines that the soldering iron 120 has not been in use for the first time period, this may indicate that the soldering iron 120 is no more used by the user. Under such circumstances, if the soldering iron 120 continues to be exposed to the air, the soldering iron bit will be oxidized. Therefore, in the embodiment of the invention, if the control unit 164b determines that the soldering iron 120 has been accommodated in the soldering iron stand 140 for the first time period, the control unit 164b will control the tin supply unit 164a to provide the tin to the soldering iron bit 122 of the soldering iron 120 such that the soldering iron bit is enclosed by the tin and isolated from the air. Thus, the soldering iron bit 122 is prevented from being oxidized, and the lifespan of the soldering iron 120 is increased.

Also, referring to FIG. 1B. The tin supply unit 164a includes a motor M1 and a supporting stand M2. The motor M1 is for transferring the tin M3. The supporting stand M2 is coupled to the soldering iron stand 140 to guide the tin M3. When the soldering iron 120 has been accommodated in the soldering iron stand 140 for the first time period, the control unit further activates the motor M1 to transfer the tin M3, so as to guide the tin M3 to the soldering iron bit 122 of the soldering iron 120 via the supporting stand M2.

Besides, in an embodiment of the invention, the control unit 164b determines whether the soldering iron 120 has been accommodated in the soldering iron stand 140 for a second time period already before determining whether the soldering iron 120 has been accommodated in the soldering iron stand 140 for the first time period. If yes, then the control unit 164b further reduces the temperature of the soldering iron bit 122. In practical, the first time period and the second time period may be about 10 minutes and 20 minutes, respectively. That is, if the time period, for which the soldering iron 120 has not been in use, is longer than 10 minutes and is not t reaching 20 minutes yet, the control unit 164b will reduce the temperature of the soldering iron bit 122. Afterwards, if the time period for which the soldering iron 120 has not been in use, is reaching 20 minutes, the control unit 164b will provide the tin to the soldering iron bit 122 and turn off the power of the soldering iron 120. Thus, the embodiment of the invention saves power and avoids energy waste by reducing the temperature of the soldering iron bit which is not in use.

Moreover, before the control unit 164b reduces the temperature of the soldering iron bit 122, the control unit 164b further stores the temperature of the soldering iron bit 122 before cooling down as a former temperature. For example, the control unit 164b stores the former temperature in a storage unit (not illustrated) of the soldering iron control module 164. After the control unit 164b reduces the temperature of the soldering iron bit 122, when it is determined that the soldering iron 120 is no more accommodated in the soldering iron stand 140, the control unit 164b further increases the temperature of the soldering iron bit 122 to the former temperature. That is, if the soldering iron 120 is no more accommodated in the soldering iron stand 140, this may indicate that the soldering iron 120 is already taken out of the soldering iron stand and the user is ready to use the soldering iron 120. However, if the former temperature of the soldering iron bit 122 is reduced in order to save power, the present temperature of the soldering iron bit 122 will be lower than the temperature which is for normal operation. Thus, at this time, the temperature of the soldering iron bit 122 is increased to the temperature such that the soldering iron bit 122 can be used by the user normally. Therefore, this invention may be able to not only save power but also avoid inconvenience for the users.

Also, referring to FIG. 1A. In an embodiment, the soldering iron control system 164 further includes a setting unit 164c for setting the first time period and the second time period. In practical, the setting unit 164c includes a control panel and a storage unit. The control panel, for example, has many buttons for receiving the numeric inputted by the user to set the first time period and the second time period. The control panel may further save the first time period and the second time period in the storage unit. However, the invention is not limited thereto. For example, the setting unit 164c may include an interface linked to a computer such that the user can set the first time period and the second time period by computer software. Anyone who is skilled in the technology of the invention will understand that any designs enabling the user to set the first time period and the second time period are within the scope of protection of the invention.

Moreover, when the control unit 164b reduces the temperature of the soldering iron 120 to a predetermined temperature for example, the predetermined temperature may be substantially 300° C.~350° C. However, this invention is not limited thereto. The predetermined temperature can be set by the user via the setting unit 164c. The temperature can also be correspondingly set by the user according to the melting temperatures of the tin.

Figure 2:
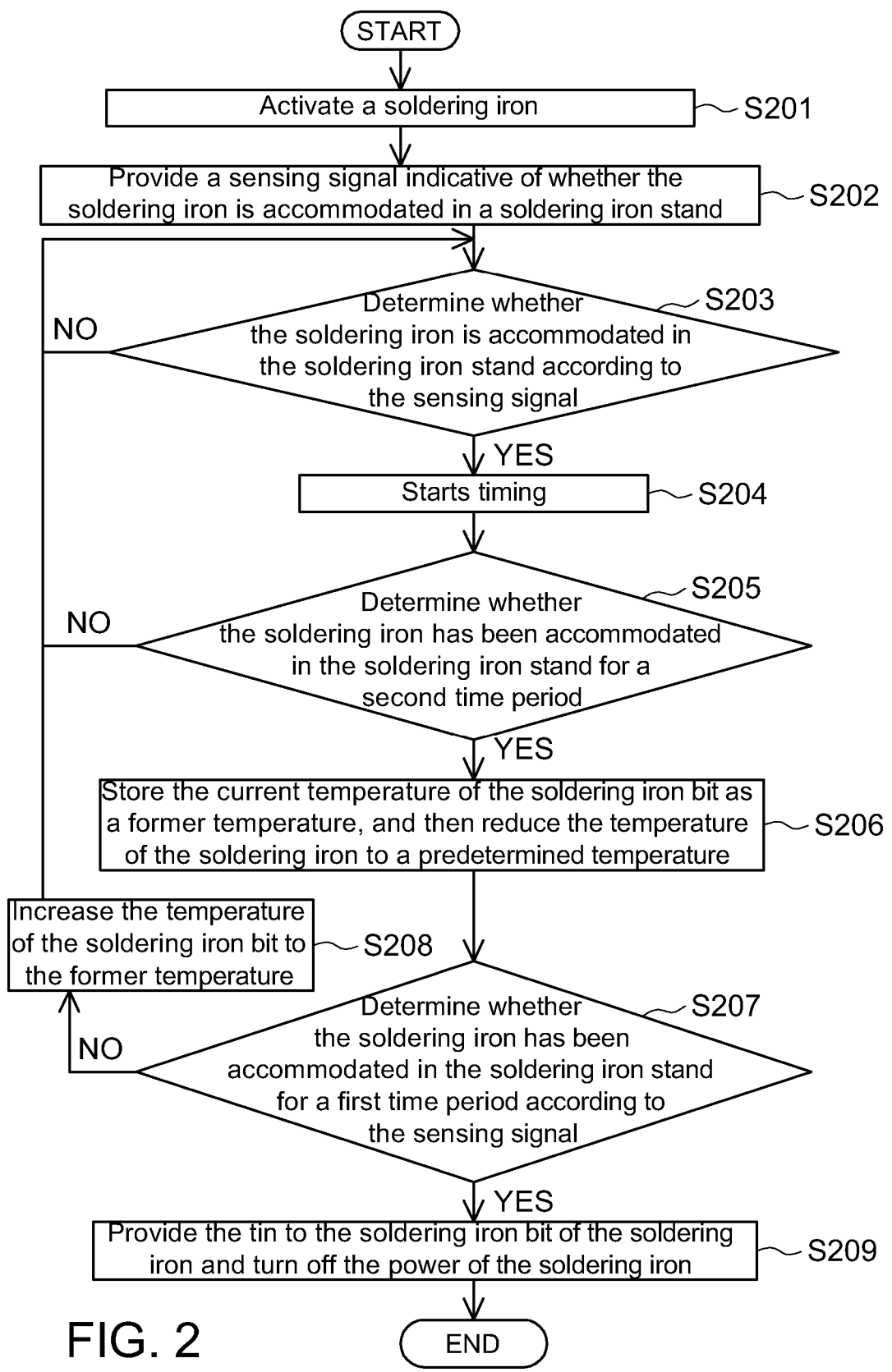
FIG. 2 shows a flowchart of a soldering iron control method according to an embodiment of the invention.

Referring to FIG. 2, a flowchart of a soldering iron control method according to an embodiment of the invention is shown. The method includes the following steps. Firstly, the method begins at step S201, a soldering iron is activated. Next, the method proceeds to step S202, a sensing signal indicating whether the soldering iron is accommodated in a soldering iron stand is provided. Then, the method proceeds to step S203, whether the soldering iron is accommodated in the soldering iron stand is determined according to the sensing signal: if so, the method proceeds to step S204, otherwise, the method proceeds to step S203. In step S204, timing starts.

Then, the method proceeds to step S205, whether the soldering iron has been accommodated in the soldering iron stand for a second time period already is determined according to the sensing signal: if so, the method proceeds to step S206, otherwise, the method proceeds to step S203. In step S206, the current temperature of the soldering iron bit is stored as a former temperature, and then the temperature of the soldering iron is reduced to a predetermined temperature. Then, the method proceeds to step S207, whether the soldering iron has been accommodated in the soldering iron stand for a first time period is determined according to the sensing signal: if so, the method proceeds to step S209, otherwise, the method proceeds to step S208. In step S208, the temperature of the soldering iron bit is increased to the former temperature, then the method proceeds to step S203. In step S209, the tin is provided to the soldering iron bit of the soldering iron, and the power of the soldering iron is turned off.

According to the soldering iron device, the soldering iron control module and the soldering iron control method thereof disclosed in the above embodiments of the invention, the soldering iron bit of the soldering iron which has not been used for a time period is automatically tinned to avoid the soldering iron bit being oxidized so as to increase the lifespan of the soldering iron.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A soldering iron control module applied to a soldering iron and a soldering iron stand, wherein the soldering iron stand is for accommodating the soldering iron, which has a soldering iron bit, the soldering iron control module comprising:
   a sensing unit for providing a sensing signal indicating whether the soldering iron is accommodated in the soldering iron stand; and
   a soldering iron control system, comprising:
      a tin supply unit; and
      a control unit for determining whether the soldering iron has been accommodated in the soldering iron stand for a first time period according to the sensing signal, wherein when the control unit determines that the soldering iron has been accommodated in the soldering iron stand for the first time period, the control unit controls the tin supply unit to provide tin to the soldering iron bit so as to protect the soldering iron bit, and turns off power of the soldering iron,
   wherein the control unit is arranged to further determine whether the soldering iron has been accommodated in the soldering iron stand for a second time period before the control unit determines whether the soldering iron has been accommodated in the soldering iron stand for the first time period, and
   wherein the control unit is arranged to further reduce a temperature of the soldering iron bit after the control unit determines that the soldering iron has been accommodated in the soldering iron stand for the second time period.

2. The soldering iron control module according to claim 1, wherein the first time period is substantially 20 minutes, and the second time period is substantially 10 minutes.

3. The soldering iron control module according to claim 1, wherein the soldering iron control system further comprises:
   a setting unit for setting the first time period and the second time period.

4. The soldering iron control module according to claim 1, wherein before the control unit reduces the temperature of the soldering iron bit, the control unit further stores the temperature of the soldering iron bit before cooling down as a former temperature; and
   wherein after the control unit reduces the temperature of the soldering iron bit, if it is determined that the soldering iron is no more accommodated in the soldering iron stand, then the control unit further increases the temperature of the soldering iron bit to the former temperature.

5. The soldering iron control module according to claim 1, wherein when the control unit reduces the temperature of the soldering iron bit, the temperature of the soldering iron bit is reduced to a predetermined temperature.

6. The soldering iron control module according to claim 5, wherein the predetermined temperature is substantially 300° C. ~350° C.

7. The soldering iron control module according to claim 1, wherein the tin supply unit comprises:
   a motor for transferring the tin; and
   a supporting stand coupled to the soldering iron stand to guide the tin;
   wherein when the soldering iron has been accommodated in the soldering iron stand for the first time period, the control unit further activates the motor to transfer the tin so as to guide the tin to the soldering iron bit via the supporting stand.

8. The soldering iron control module according to claim 1, wherein the sensing unit is a light sensor, which determines the output of the sensing signal by detecting whether the soldering iron is accommodated in the soldering iron stand and affects the state of the light received by the light sensor.

9. A soldering iron device, comprising:
   a soldering iron having a soldering iron bit;
   a soldering iron stand for accommodating the soldering iron; and
   a soldering iron control module, comprising:
      a sensing unit for providing a sensing signal indicating whether the soldering iron is accommodated in the soldering iron stand; and
      a soldering iron control system, comprising:
         a tin supply unit; and
         a control unit for determining whether the soldering iron has been accommodated in the soldering iron stand for a first time period according to the sensing signal,
         wherein when the control unit determines that the soldering iron has been accommodated in the soldering iron stand for the first time period, the control unit controls the tin supply unit to provide tin to the soldering iron bit so as to protect the soldering iron bit, and turns off the power of the soldering iron,
         wherein the control unit is arranged to further determine whether the soldering iron has been accommodated in the soldering iron stand for a second time period before the control unit determines whether the soldering iron has been accommodated in the soldering iron stand for the first time period, and
         wherein the control unit is arranged to further reduce a temperature of the soldering iron bit after the control unit determines that the soldering iron has been accommodated in the soldering iron stand for the second time period.

10. The soldering iron device according to claim 9, wherein the tin supply unit comprises:
   a motor for transferring the tin; and
   a supporting stand coupled to the soldering iron stand to guide the tin;
   wherein when the soldering iron has been accommodated in the soldering iron stand for the first time period, the control unit further activates the motor to transfer the tin and guide the tin to the soldering iron bit via the supporting stand.

* * * * *